US008688370B2

(12) United States Patent
Kon et al.

(10) Patent No.: US 8,688,370 B2
(45) Date of Patent: Apr. 1, 2014

(54) INFORMATION DISPLAY METHOD, INFORMATION PROCESSING APPARATUS, AND INFORMATION DISPLAY PROGRAM

(75) Inventors: Takayasu Kon, Tokyo (JP); Yoichiro Sako, Tokyo (JP); Yasunori Kamada, Kanagawa (JP); Kazunori Hayashi, Tokyo (JP); Masamichi Asukai, Kanagawa (JP); Akane Sano, Tokyo (JP); Akinobu Sugino, Kanagawa (JP); Taiji Ito, Kanagawa (JP); Yoshiteru Kamatani, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/613,610

(22) Filed: Sep. 13, 2012

(65) Prior Publication Data

US 2013/0013186 A1 Jan. 10, 2013

Related U.S. Application Data

(62) Division of application No. 12/494,638, filed on Jun. 30, 2009, now Pat. No. 8,321,127.

(30) Foreign Application Priority Data

Jul. 2, 2008 (JP) ................................ 2008-173200

(51) Int. Cl.
*G01C 21/00* (2006.01)
(52) U.S. Cl.
USPC ...................................................... 701/409
(58) Field of Classification Search
USPC ......... 701/400, 409, 412, 415, 418, 421, 432, 701/451, 454, 455
See application file for complete search history.

(56) References Cited

U.S. PATENT DOCUMENTS

| 6,289,278 B1 * | 9/2001 | Endo et al. ..................... 701/431 |
| 6,327,522 B1 * | 12/2001 | Kojima et al. ..................... 701/1 |
| 2009/0143980 A1 | 6/2009 | Halters et al. |

FOREIGN PATENT DOCUMENTS

| JP | 60-186999 A | 9/1985 |
| JP | 04-045476 | 2/1992 |
| JP | 5-150719 A | 6/1993 |
| JP | 07-043800 B | 5/1995 |
| JP | 8-005394 A | 1/1996 |
| JP | 08-016992 A | 1/1996 |
| JP | 08-021738 A | 1/1996 |
| JP | 08-233585 A | 9/1996 |
| JP | 2001-289664 A | 10/2001 |
| JP | 2002-333831 A | 11/2002 |
| JP | 2003-121162 A | 4/2003 |
| JP | 2004-126338 A | 4/2004 |
| JP | 2005-321575 A | 11/2005 |

* cited by examiner

*Primary Examiner* — Kim T Nguyen
(74) *Attorney, Agent, or Firm* — Wolf, Greenfield & Sacks, P.C.

(57) ABSTRACT

Disclosed is an information display method whereby an information processing apparatus displays a map on a display screen such that a cursor is displayed at a position measured as the current position of a position indication object on the map. The method includes the steps of, when the moving speed of the position indication object is equal to or less than a threshold speed, scrolling the map on the display screen in accordance with the movement of the position indication object in a first display mode, and when the moving speed of the position indication object is greater than the threshold speed, fixing the map on the display screen in a second display mode or reducing the speed of scrolling the map on the display screen so that the scrolling speed is less than that in the first display mode.

15 Claims, 15 Drawing Sheets

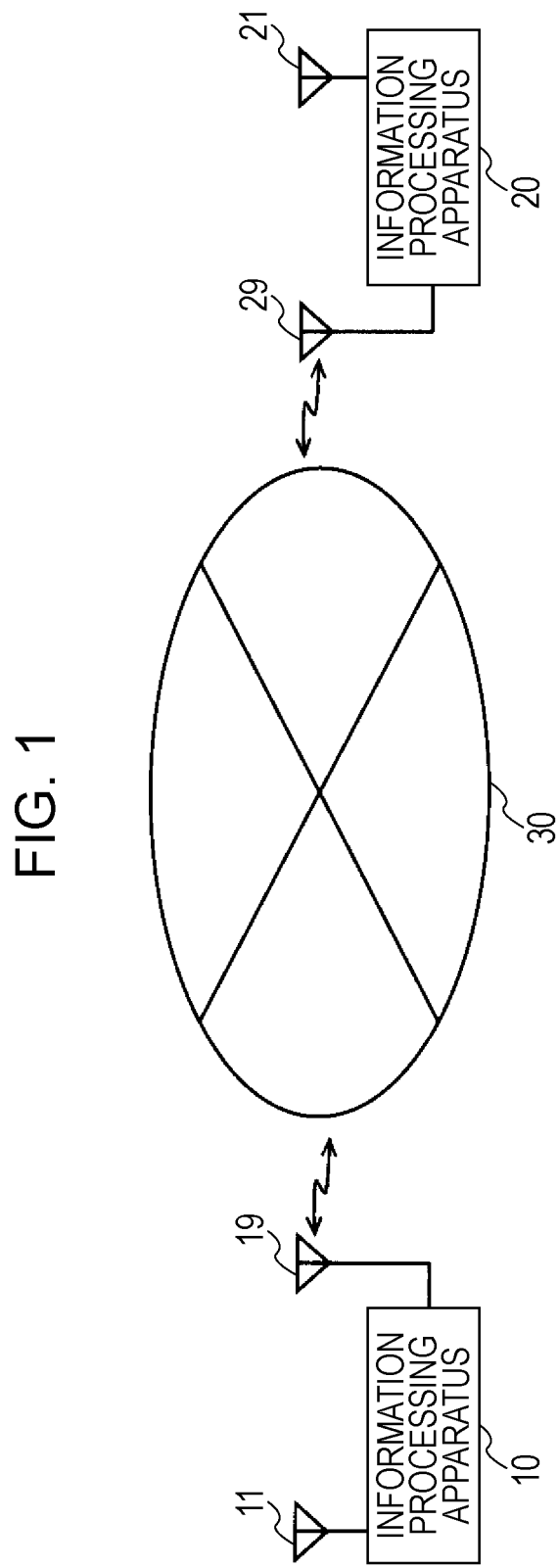

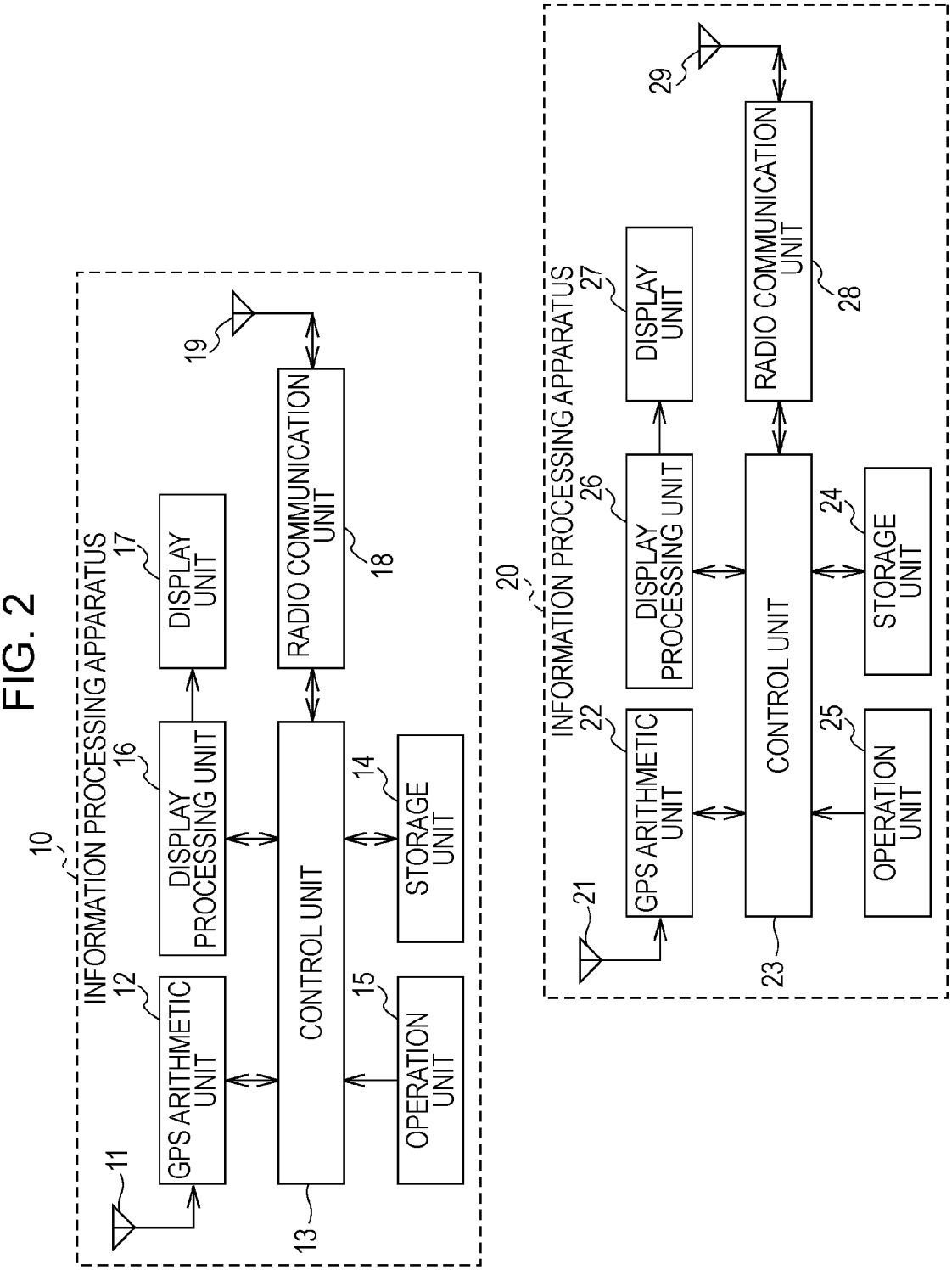

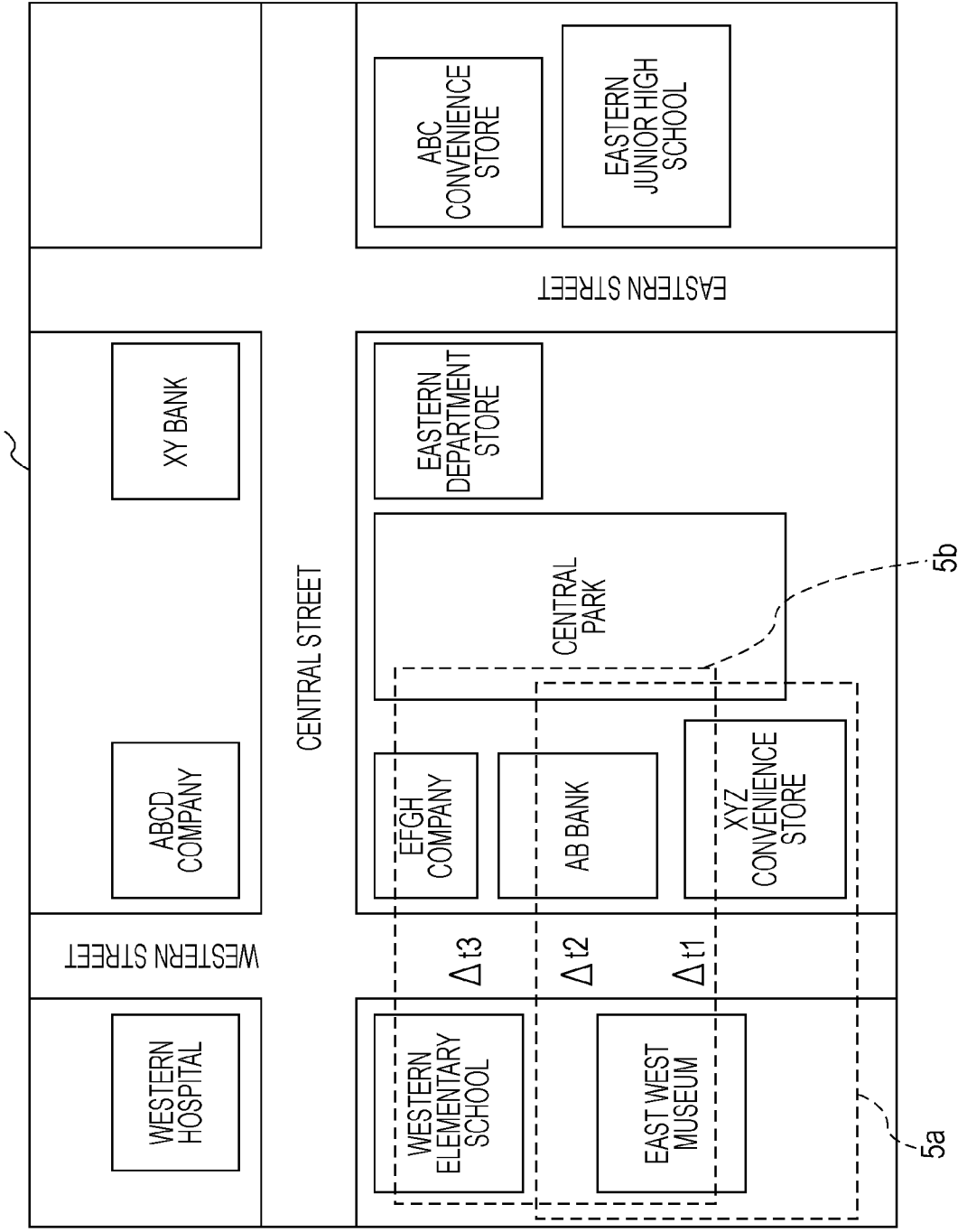

TIME t1

TIME t2

JUST AFTER TIME t2

SINGLE-POINT DISPLAY MODE (TIME t1)

MULTI-POINT DISPLAY MODE (TIME t2)

TIME t1

TIME t2

TIME t3

INFORMATION DISPLAY METHOD, INFORMATION PROCESSING APPARATUS, AND INFORMATION DISPLAY PROGRAM

CROSS REFERENCES TO RELATED APPLICATIONS

This application is a divisional of and claims the benefit under 35 U.S.C. §120 of U.S. patent application Ser. No. 12/494,638, titled "INFORMATION DISPLAY METHOD, INFORMATION PROCESSING APPARATUS, AND INFORMATION DISPLAY PROGRAM," filed on Jun. 30, 2009, which claims the benefit under 35 U.S.C. §119 of Japanese Patent Application JP 2008-173200, filed on Jul. 2, 2008. These applications are hereby incorporated by reference in their entireties.

BACKGROUND OF THE INVENTION

1. Field of the Invention

The present invention relates to a method and apparatus for displaying a map on a display screen such that a cursor (mark) indicating an object whose position is to be indicated (hereinafter, "position indication object") is displayed at a position, measured as the current position of the position indication object, on the map.

2. Description of the Related Art

Portable navigation apparatuses using the global positioning system (GPS) are widely used.

In addition, there are many pieces of software for indicating the position of a position indication object as a moving object, such as a human being, a device, or a vehicle, on a map using location log data.

It is assumed that the position of a position indication object measured as a current position is indicated by a cursor on a map. According to a typical method, when the position indication object moves, the map is scrolled while the cursor is fixed at a certain point, e.g., the center point of the display screen.

According to an apparatus disclosed in Japanese Unexamined Patent Application Publication No. 4-45476, when the position of a position indication object is displayed on a map, a time interval for position measurement is changed in accordance with a moving speed of the position indication object.

SUMMARY OF THE INVENTION

According to the above-described method in which the map is scrolled while the cursor indicating the position of the position indication object is fixed at a certain point on the display screen, so long as the relationship between the scale of the map and the moving speed of the position indication object is appropriate, map information can be provided appropriately.

If the moving speed increases, for example, as the moving state of a user changes from walking to running, the map is scrolled too fast at the scale suitable for the preceding moving speed. In some cases, information is not read out accurately.

FIG. 3 illustrates a map 5 showing an area where the user walks or runs. In the area shown by the map 5, a Central Street running east to west, an Eastern Street and a Western Street each running north to south, various facilities, and schools are located.

It is assumed that the user walks or runs along the Western Street toward the north and passes the East West Museum at time t1.

Referring to FIG. 15A, part of the map 5 shown in FIG. 3 is displayed as a map 5a on a display screen 1 at time t1. A cursor 9a indicating the current position of the user is displayed at the center of the display screen 1 (map 5a).

At that time, a landmark of the East West Museum is displayed as part of the map 5a on the display screen 1 and information 7 including, for example, a photo and text about the East West Museum is displayed in the vicinity of the landmark.

When the user moves at high speed in the above situation, the map is scrolled at high speed on the display screen 1. At time t2 after a lapse of predetermined time from time t1, as shown in FIG. 15B, a map 5e showing an area considerably shifted from that shown by the map 5a is displayed on the display screen 1.

At time t3 after a lapse of predetermined time from time t2, as shown in FIG. 15C, a map 5f showing an area considerably shifted from that shown by the map 5e is displayed on the display screen 1.

Accordingly, the information 7 including the photo and text about the East West Museum is not displayed at time t2. The landmark of the East West Museum is not displayed at time t3. Consequently, it is difficult to reliably read information.

It is desirable to reliably read necessary information even when the moving speed of a position indication object is high.

According to an embodiment of the present invention, there is provided an information display method whereby an information processing apparatus displays a map on a display screen such that a cursor is displayed at a position measured as the current position of a position indication object on the map. The method includes the steps of, when the moving speed of the position indication object is equal to or less than a threshold speed, scrolling the map on the display screen in accordance with the movement of the position indication object in a first display mode, and when the moving speed of the position indication object is greater than the threshold speed, fixing the map on the display screen in a second display mode or reducing the speed of scrolling the map on the display screen so that the scrolling speed is lower than that in the first display mode.

According to this method in accordance with the embodiment of the present invention, when the moving speed of the position indication object is greater than the threshold speed, the map is fixed on the display screen without being scrolled, alternatively, the map is scrolled on the display screen at a lower speed. Accordingly, information is displayed on the display screen for a long time so that necessary information can be reliably read.

As described above, according to the embodiment of the present invention, even when the moving speed of a position indication object is high, necessary information can be reliably read.

DESCRIPTION OF THE DRAWINGS

FIG. 1 is a diagram illustrating an information display system that performs an information display method according to an embodiment of the present invention;

FIG. 2 is a diagram illustrating information processing apparatuses in the embodiment;

FIG. 3 is a diagram illustrating a map;

DESCRIPTION OF THE PREFERRED EMBODIMENTS

1. Information Display System

Figure 4A:
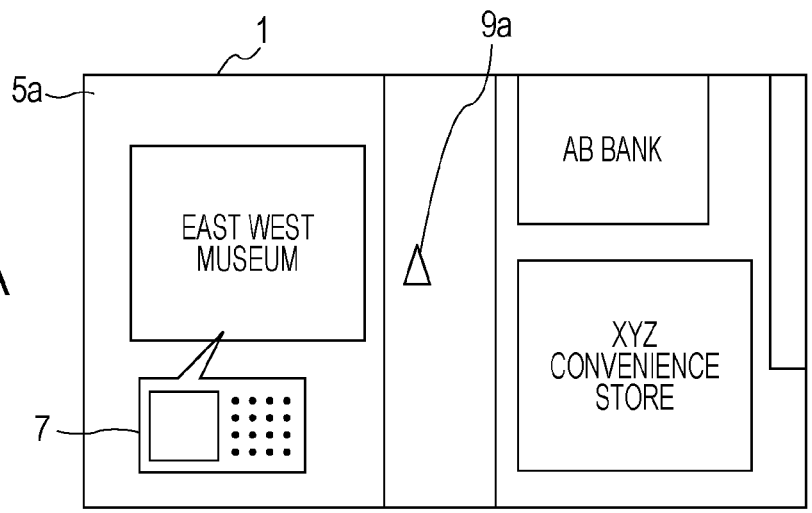
FIGS. 4A to 4C are diagrams illustrating display states in a map scroll mode and a map fixed mode in a single-point display mode.

FIG. 1 illustrates an information display system that performs an information display method according to an embodiment of the present invention.

The information display system includes information processing apparatuses 10 and 20, each having a positioning function and a radio communication function, such that the information processing apparatuses are connected through the respective radio communication functions to each other via a network 30.

The information processing apparatus 10 is used by a user A. The user A carries the information processing apparatus 10. Alternatively, the information processing apparatus 10 is installed in a vehicle in which the user A rides. The information processing apparatus 20 is used by a user B. The user B carries the information processing apparatus 20. Alternatively, the information processing apparatus 20 is installed in a vehicle in which the user B rides.

FIG. 2 illustrates exemplary configurations of the information processing apparatuses 10 and 20.

The information processing apparatus 10 includes a GPS antenna 11, a GPS arithmetic unit 12, a control unit 13, a storage unit 14, an operation unit 15, a display processing unit 16, a display unit 17, a radio communication unit 18, and a radio communication antenna 19.

The GPS antenna 11 receives a radio wave from a GPS satellite. The GPS arithmetic unit 12 demodulates a received signal and performs an arithmetic operation on the signal to measure the position of the information processing apparatus 10.

The control unit 13 controls respective units of the information processing apparatus 10. Although components of the control unit 13 are not shown in the figure, the control unit 13 includes a CPU, a ROM in which a program to be executed by the CPU and fixed data, and a RAM in which a program or data is developed.

The storage unit 14, functioning as a bulk memory, stores map information and content information.

It is unnecessary to store map information in the information processing apparatus 10. The information display system may be designed so that the information processing apparatus 10 acquires map information from a server, connected thereto, of the user A or a service provider's server connected to the network 30.

The operation unit 15 is operated by the user A to perform various operations on the information processing apparatus 10.

The display processing unit 16 displays a map and necessary information on a display screen of the display unit 17 on the basis of information, e.g., the map information stored in the storage unit 14 and location information obtained by the GPS arithmetic unit 12 as will be described later.

The display unit 17 includes a display, such as a liquid crystal display or an organic electroluminescent (EL) display.

The radio communication unit 18 transmits location information, obtained by the GPS arithmetic unit 12, as information indicating the current position of the information processing apparatus 10 to the information processing apparatus 20 and also receives location information, transmitted from the information processing apparatus 20, as information indicating the current position of the information processing apparatus 20.

The information processing apparatus 20 also includes a GPS antenna 21, a GPS arithmetic unit 22, a control unit 23, a storage unit 24, an operation unit 25, a display processing unit 26, a display unit 27, a radio communication unit 28, and a radio communication antenna 29. The configurations and operations of the respective components are the same as those in the information processing apparatus 10.

2. Information Display Method

The information display method according to the embodiment of the present invention includes a single-point display mode and a multi-point display mode.

As for the single-point display mode, in the information display system illustrated in FIGS. 1 and 2, each of the information processing apparatuses 10 and 20 displays a map on the display screen such that a cursor indicating the apparatus is displayed at the position of the apparatus on the map.

As for the multi-point display mode, in the information display system in FIGS. 1 and 2, each of the information processing apparatuses 10 and 20 displays a map on the display screen such that a cursor indicating the position of the apparatus and another cursor indicating the position of another apparatus are simultaneously displayed at the position of the apparatus and that of the other apparatus, respectively.

In the information display system in FIGS. 1 and 2, another apparatus for the information processing apparatus 10 is the information processing apparatus 20 and that for the information processing apparatus 20 is the information processing apparatus 10.

When the user A carries the information processing apparatus 10, the position of the information processing apparatus 10 is the position of the user A. When the information processing apparatus 10 is installed in the vehicle and the user A rides in the vehicle, the position of the information processing apparatus 10 is the position of the vehicle and is also that of the user A.

Similarly, when the user B carries the information processing apparatus 20, the position of the information processing apparatus 20 is the position of the user B. When the information processing apparatus 20 is installed in the vehicle and the user B rides in the vehicle, the position of the information processing apparatus 20 is the position of the vehicle and is also that of the user B.

In the following description, therefore, it is assumed that the position of the information processing apparatus 10 is that of the user A and the position of the information processing apparatus 20 is that of the user B.

Assuming that the scale of a map is expressed by a fraction of 1/M, when the denominator "M" is a large value, the map scale is small, namely, the ratio is small. When the denominator "M" is a small value, the map scale is large, namely, the ratio is large.

Accordingly, as the map scale is smaller (the scale denominator is larger), a map showing a larger actual area can be displayed on the display screen.

2-1. Single-Point Display Mode of Information Display Method

The single-point display mode in the information processing apparatus 10 is exactly the same as that in the information processing apparatus 20. Accordingly, the single-point display mode in the information processing apparatus 10 will now be described below.

It is assumed that the user A carrying the information processing apparatus 10 walks or runs in an area shown by the map 5 in FIG. 3, alternatively, the user A on the vehicle, in which the information processing apparatus 10 is installed, drives the area shown by the map 5.

In the area shown by the map 5, the Central Street running east to west, the Eastern and Western Streets running north to south, and various facilities and schools are located.

It is assumed that the user A moves along the Western Street toward the north and passes the East West Museum at time t1, serving as a certain sampling time at an appropriate sampling rate, as a result of position measurement by the GPS arithmetic unit 12 of the information processing apparatus 10.

It is further assumed that the user A passes a location between the East West Museum and a Western Elementary School at time t2, serving as the next sampling time, and passes the Western Elementary School at time t3, as the following sampling time.

2-1-1. Map Scroll Mode

It is assumed that the moving speed of the user A is equal to or less than a threshold speed Vth before time t1 and the moving speed of the user A is greater than the threshold speed Vth at time t1.

In this case, a map scroll mode is set up to time t1. The map is scrolled at a scroll speed suitable for the moving speed of the user A on the display screen. The cursor indicating the user A is displayed so as to be fixed at a certain point on the display screen, for example, the center thereof.

Accordingly, as shown in FIG. 4A, part of the map 5 in FIG. 3 is displayed as a map 5a on the display screen 1 and the cursor, indicated at 9a, is displayed at the center of the display screen 1 (the map 5a).

On the map 5a, for example, information 7 including a photo and text about the East West Museum is displayed in the vicinity of a landmark of the East West Museum.

2-1-2. Switching to Map Fixed Mode

When the moving speed of the user A is greater than the threshold speed Vth at time t1, the display mode is switched from the map scroll mode to a map fixed mode. The threshold speed Vth is set to a proper value in accordance with the map scale in the map scroll mode.

In the map fixed mode, the map is not scrolled on the display screen 1. The map 5a is displayed as it is on the display screen 1. Specifically, when the moving speed of the user A is greater than the threshold speed Vth, the map is fixed on the display screen 1 without being scrolled at a high scroll speed suitable for the moving speed of the user A.

Figure 15A:
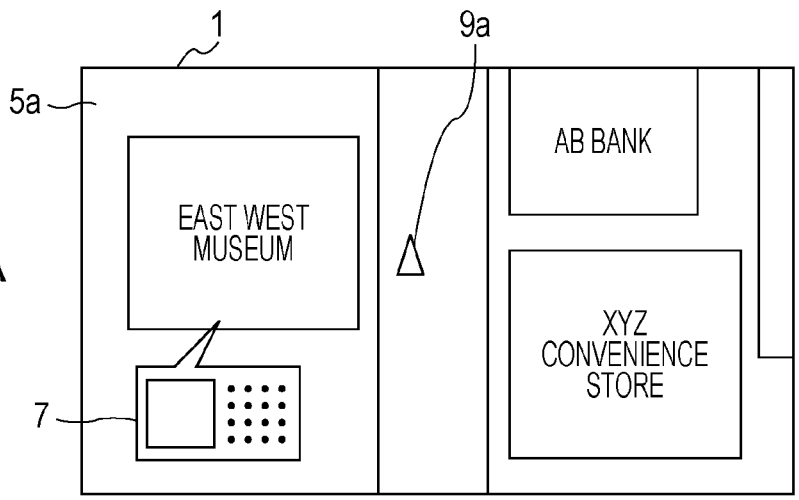
FIGS. 15A to 15C are diagrams explaining a case where a map is scrolled on a display screen in accordance with the movement of a moving object.
Figure 15B:
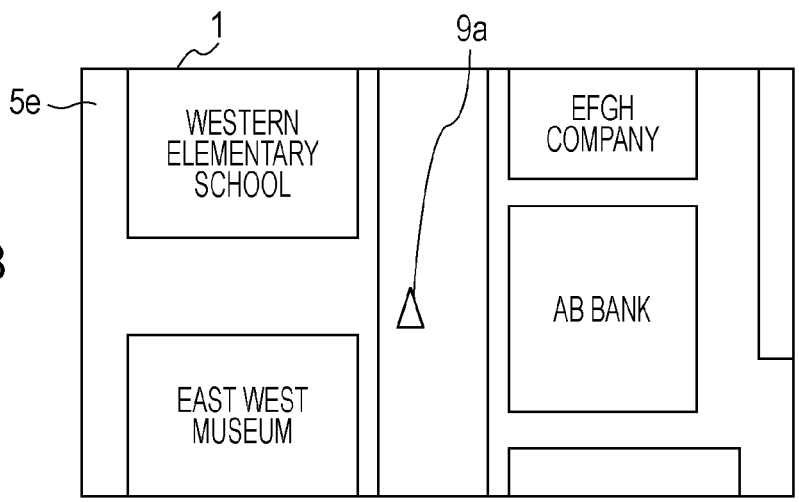
Figure 15C:
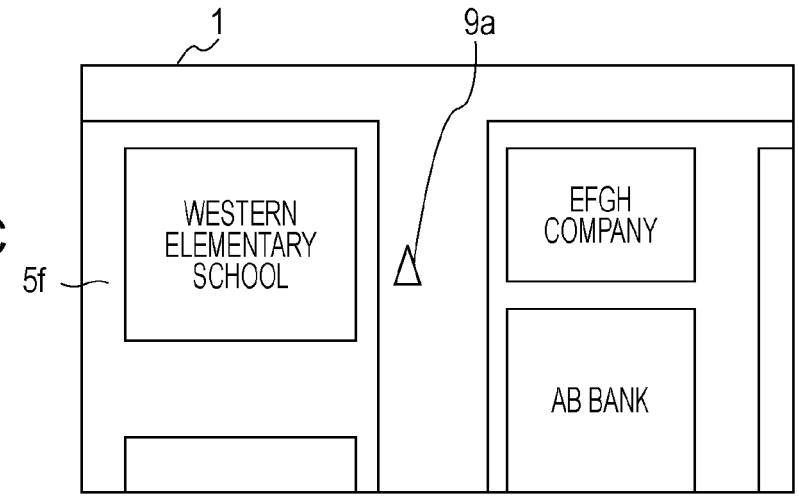

Consequently, such a problem that it is difficult to read the information 7 including the photo and text about the East West Museum, as shown in FIG. 15, can be solved.

Figure 4B:
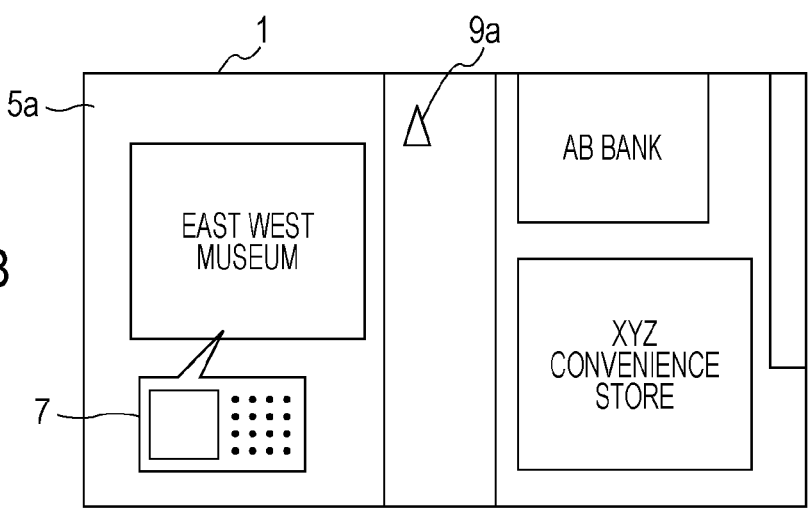

At that time, the cursor 9a moves on the display screen 1 (the map 5a). At time t2, the cursor 9a is displayed in the vicinity of the upper end of the display screen 1 as shown in FIG. 4B.

2-1-3. Map Changing in Map Fixed Mode

In the map fixed mode, if the user A further moves in the same direction, the cursor 9a disappears from the display screen 1.

Figure 5A:
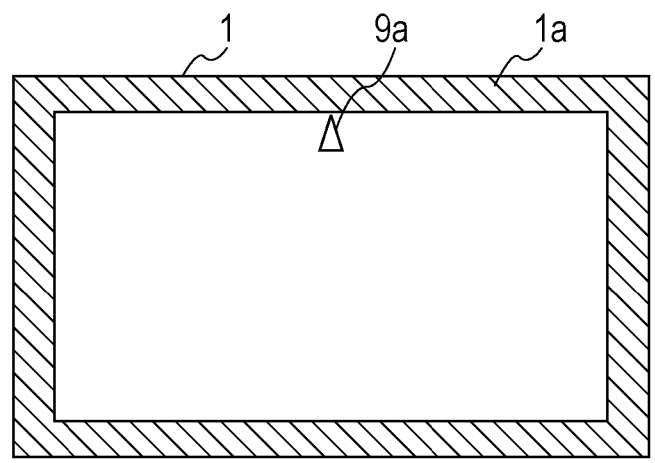
FIGS. 5A and 5B are diagrams explaining map changing in the map fixed mode.
Figure 5B:
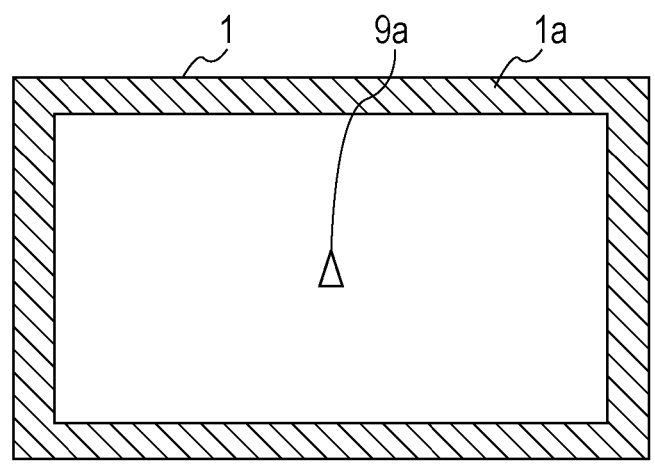

Accordingly, when the cursor 9a approaches a predetermined peripheral portion 1a of the display screen 1, as shown in FIG. 5A, the map is shifted on the display screen 1, so that the cursor 9a is shifted inward from the peripheral portion 1a of the display screen 1 as shown in FIG. 5B.

Figure 4C:
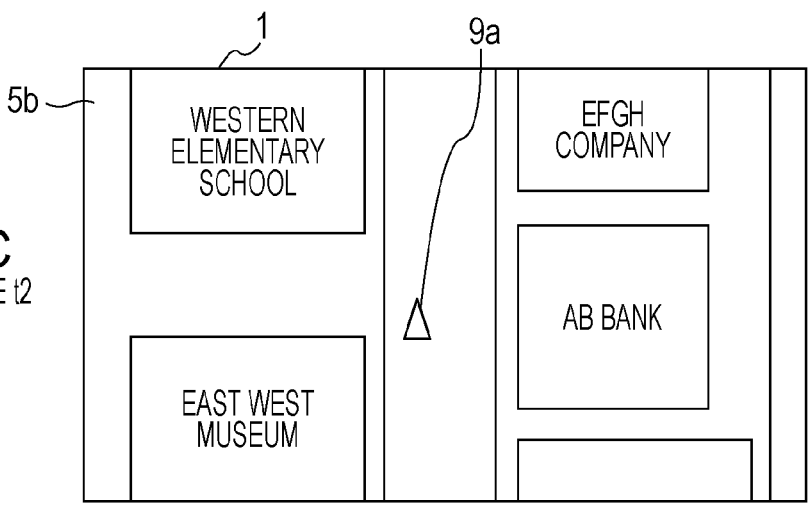

FIG. 4C illustrates a case where a map 5b, shifted from the map 5a of FIG. 4B, showing another part of the map 5 of FIG. 3 is displayed on the display screen 1 and the shifted cursor 9a is displayed at the center of the display screen 1.

Map changing in this case is different from that by scrolling the map in the map scroll mode. To prevent the cursor 9a from disappearing from the display screen 1, the map displayed on the display screen 1 is instantaneously changed to another one.

Specifically, after the map is changed as shown in FIG. 4C, the map 5b is displayed on the display screen 1 in the map fixed mode without being scrolled.

When the cursor 9a again approaches the peripheral portion 1a of the display screen 1, as shown in FIG. 5A, the map displayed on the display screen 1 is changed.

Figure 6:
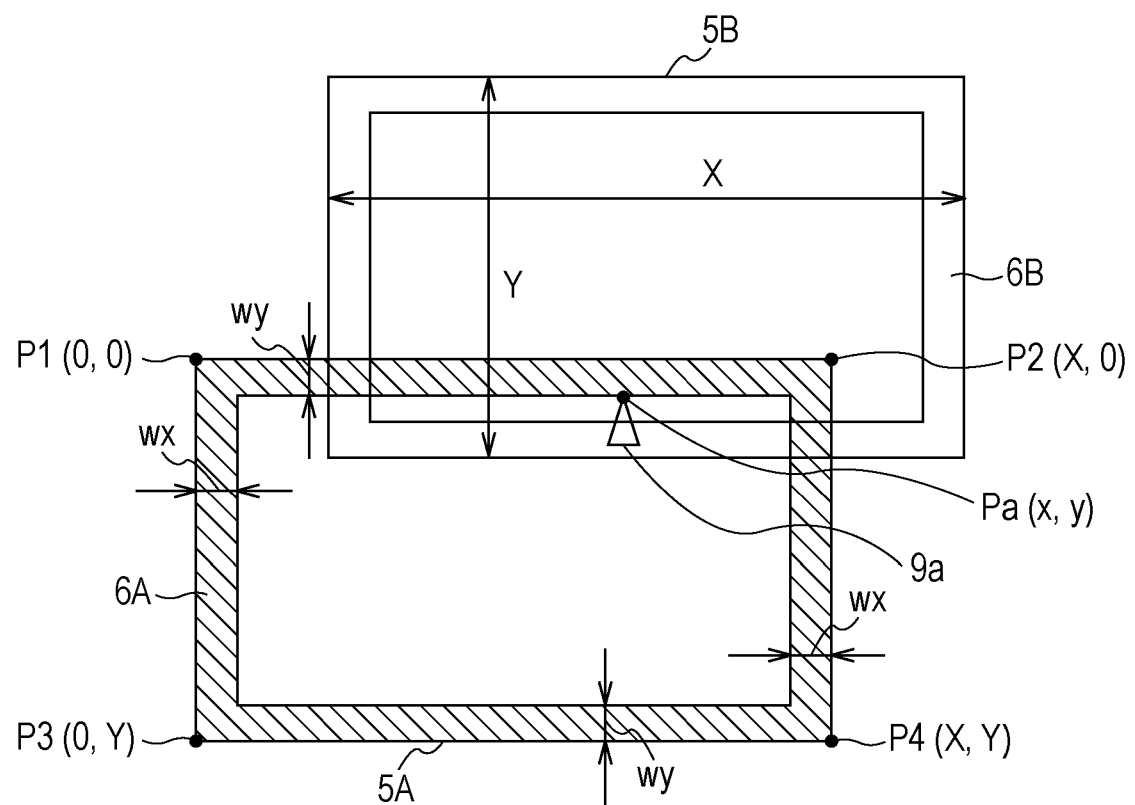
FIG. 6 is a diagram explaining map changing in the map fixed mode.

The above-described case is heading-up display, namely, the map is displayed such that the moving direction of a position indication object is upward on the display screen and the position indication object moves toward the north. Map display, including that in the multi-point display mode, is generally performed as shown in FIG. 6.

A map showing area 5A is part displayed on the display screen before changing. A map showing area 5B is another part displayed on the display screen after changing.

P1(0, 0), P2(X, 0), P3(0, Y), and P4(X, Y) correspond to the upper left corner, the upper right corner, the lower left corner, and the lower right corner of the map showing area 5A, respectively.

X denotes the size (the number of pixels) in the lateral direction of each of the map showing areas 5A and 5B. Y denotes the size (the number of pixels) in the longitudinal direction of each of the map showing areas 5A and 5B.

In the map showing area 5A, a peripheral portion 6A shown by hatching is set. Let wx denote the width (the number of pixels) in the lateral direction of the peripheral portion 6A and let wy denote the width (the number of pixels) in the longitudinal direction thereof.

When the ratio of the peripheral portion to the map showing area in the lateral direction is expressed by $px=(wx/X) \times 100[\%]$ and that in the longitudinal direction is expressed by $py=(wy/Y) \times 100[\%]$, the following relationships are satisfied:

$$0 < px < 50; \text{ and}$$

$$0 < py < 50.$$

Let Pa(x, y) denote a point indicated by the cursor 9a in the map showing area 5A.

The map displayed on the display screen 1 is changed from the map showing area 5A to the map showing area 5B when the point Pa(x, y) is located within the peripheral portion 6A, namely, any of the following relationships is satisfied:

$0 \le x \le wx;$ $X-wx \le x \le X;$ $0 \le y \le wy;$ and $Y-wy \le y \le Y.$

The map showing area 5B after changing is set so that the point Pa(x, y) indicated by the cursor 9a is located on the map showing area 5B as follows.

When the position indication object moves longitudinally in the displayed map, an area where x=X/2 and y=Y−wy−α or y=wy+α is the map showing area 5B. When the position indication object moves laterally in the displayed map, an area where y=Y/2 and x=wx+α or x=X−wx−α is the map showing area 5B. When the position indication object moves obliquely in the displayed map, an area where y=Y−wy−α or y=wy+α, and x=wx+α or x=X−wx−α is the map showing area 5B.

Let α denote a distance from the inner edge of a peripheral portion 6B in the case where the peripheral portion 6B is set in the map showing area 5B in a manner similar to the map showing area 5A.

The distance α is set to an appropriate value so that the point Pa(x, y) indicated by the cursor 9a on the map showing area 5B is located inside the inner edge of the peripheral portion 6B.

After changing, the map showing area 5B is used as a map showing area before changing. Whether the map showing area is changed is determined on the basis of whether the above-described conditions for changing are satisfied. When the map showing area is changed, the area is changed in the above-described manner.

2-1-4. Switching from Map Fixed Mode to Map Scroll Mode

When the moving speed of the user A is less than the predetermined value after the display mode is switched from the map scroll mode to the map fixed mode as described above, the display mode is contrarily switched from the map fixed mode to the map scroll mode.

Figure 7:
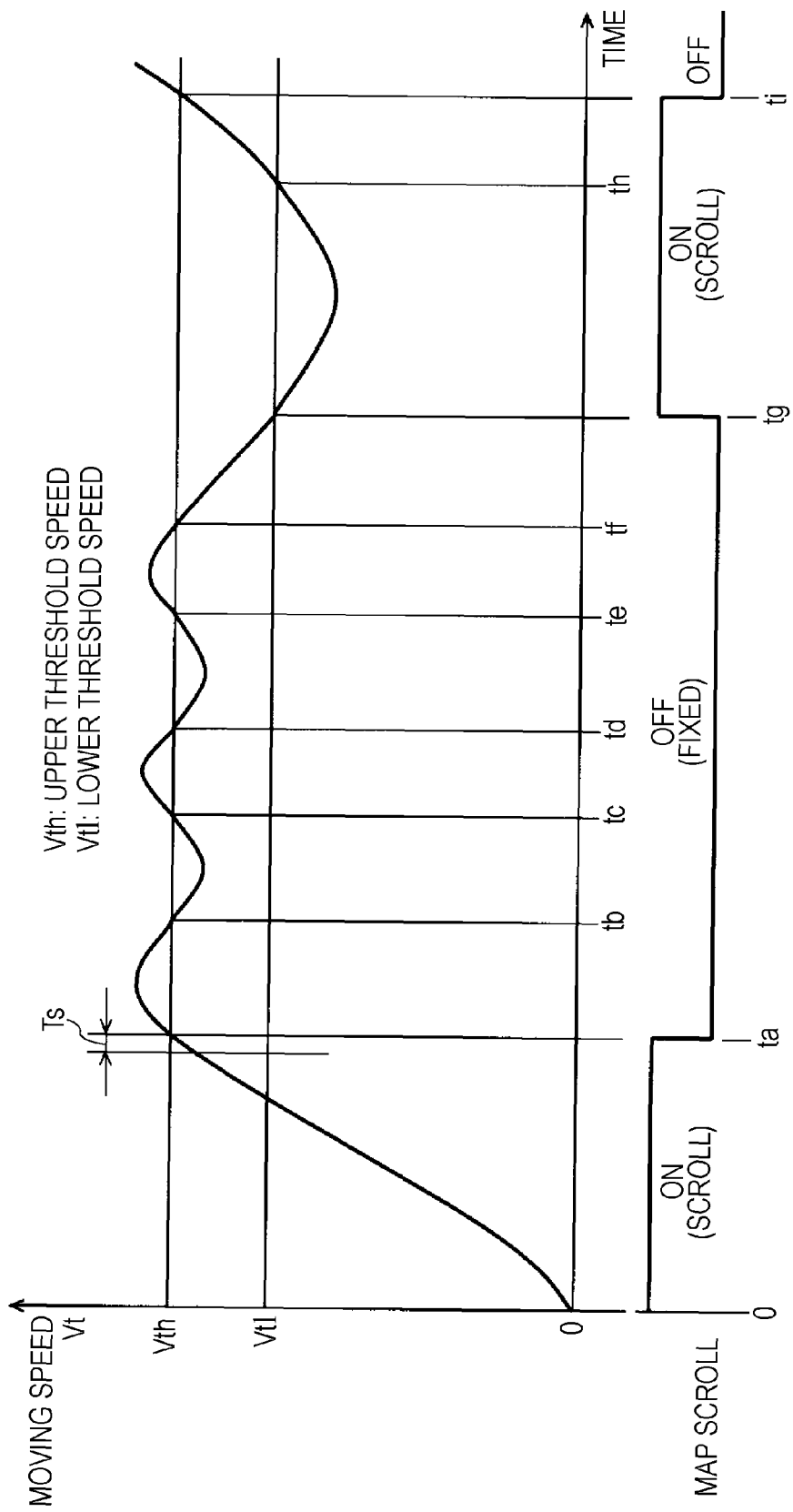
FIG. 7 is a diagram explaining mode switching between the map scroll mode and the map fixed mode.

In some cases, for example, as shown by a curve in FIG. 7, the moving speed, indicated at Vt, of the user A is greater than the threshold speed Vth at time to and, after that, the moving speed Vt varies around the threshold speed Vth so as to be at the threshold speed Vth at time points tb, tc, td, te, and tf.

It is not preferable that the display mode be changed at each of the time points tb, tc, td, te, and tf.

Accordingly, the threshold speed Vth is set as an upper threshold speed and a threshold speed Vtl lower than the threshold speed Vth is set as a lower threshold speed so that hysteresis is provided for changing the display mode as follows.

A unit time Is shown in FIG. 7 is a time interval between a sampling time point and the next sampling time point in a result of position measurement.

The moving speed Vt is obtained by dividing the unit time Ts into a distance Ds in which the user A moved for a period corresponding to the unit time Ts, namely, the moving speed Vt is expressed as Ds/Ts. The distance Ds is calculated from a measured position.

When the moving speed Vt is increasing, a moving speed Vt(n) at time t(n) is greater than a moving speed Vt(n−1) at time t(n−1) earlier than time t(n) by the unit time Ts.

On the other hand, when the moving speed Vt is decreasing, the moving speed Vt(n) at time t(n) is less than the moving speed Vt(n−1) at time t(n−1) earlier than time t(n) by the unit time Ts.

Accordingly, whether the moving speed Vt is increasing or decreasing is determined by comparing the moving speed Vt(n) at time t(n) with the moving speed Vt(n−1) at time t(n−1) earlier than time t(n) by the unit time Ts.

In the case where the moving speed Vt is increasing, when the moving speed Vt is greater than the upper threshold speed Vth just after time ta as shown in FIG. 7, the display mode is switched from the map scroll mode to the map fixed mode as described above.

On the other hand, in the case where the moving speed Vt is decreasing, even when the moving speed Vt is less than the upper threshold speed Vth as shown at time tb, td, or tf, the map fixed mode is not switched to the map scroll mode. However, when the moving speed Vt is less than the lower threshold speed Vtl as shown at time tg, the map fixed mode is switched to the map scroll mode.

Consequently, in FIG. 7, the display mode is switched from the map scroll mode to the map fixed mode at time ta. The map fixed mode is switched to the map scroll mode at time tg. The map scroll mode is switched to the map fixed mode at time ti after time th following time tg.

Accordingly, this prevents the problem that the display mode is often changed in a short time due to a variation in the moving speed Vt within a small range in the short time.

2-2. Multi-Point Display Mode of Information Display Method

In the information display system in FIGS. 1 and 2, each of the information processing apparatuses 10 and 20 can display a map on the display screen such that a cursor indicating the apparatus and another cursor indicating another apparatus can be simultaneously displayed in the position of the apparatus and that of the other apparatus on the map, respectively.

The multi-point display mode in the information processing apparatus 10 is exactly the same as that in the information processing apparatus 20. Accordingly, the multi-point display mode in the information processing apparatus 10 will be described below.

Figure 8:
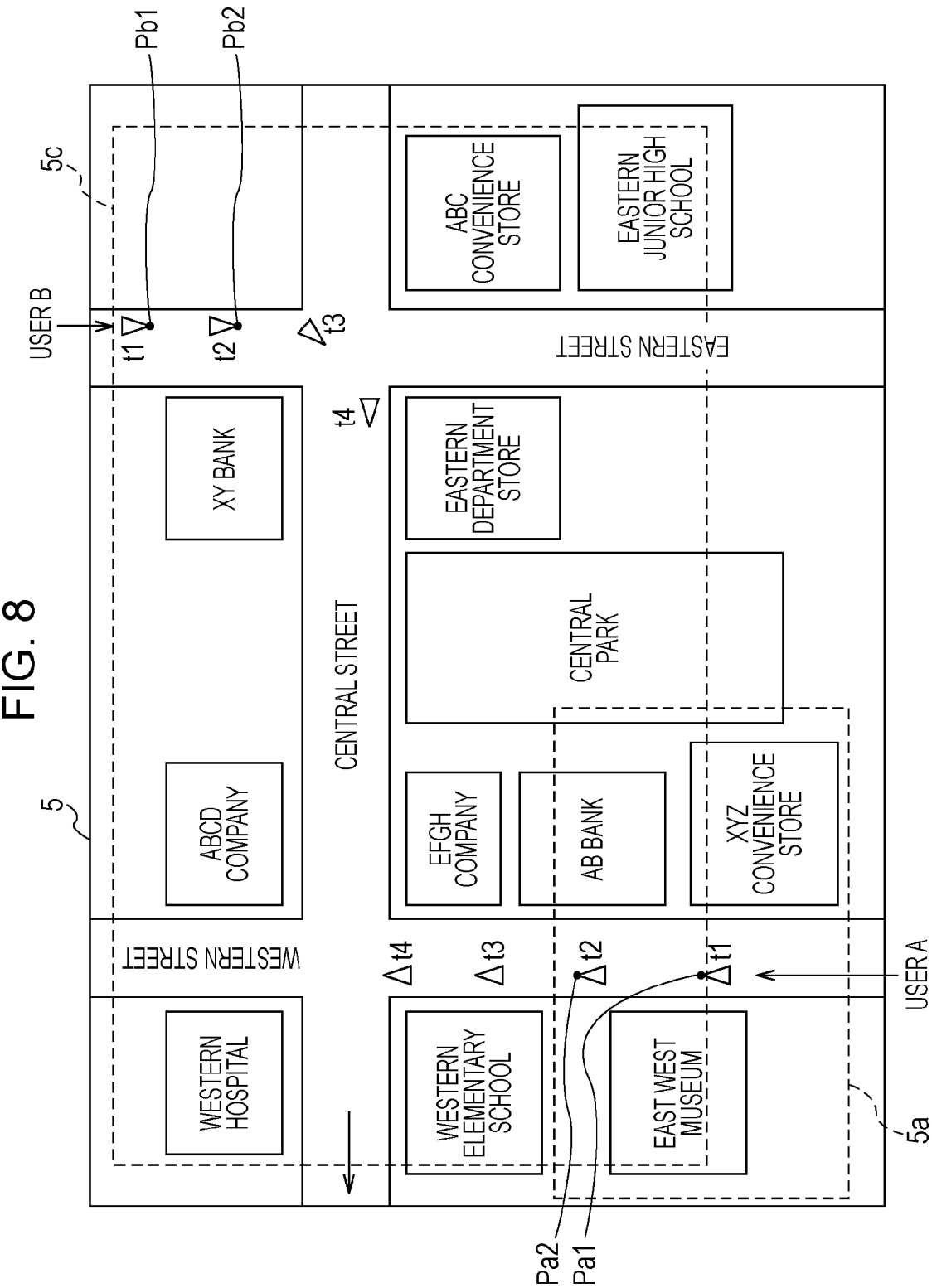
FIG. 8 is a diagram illustrating a map.

It is assumed that the users A and B, carrying the information processing apparatuses 10 and 20, respectively, or riding in their vehicles in which the information processing apparatuses 10 and 20 are installed, respectively, meet up with each other in a certain location in an area shown by the map 5 of FIG. 8 and travel toward a western destination in the area. The map 5 of FIG. 8 is exactly the same as that of FIG. 3.

It is assumed that the user A moves toward the north along the Western Street at time points t1, t2, and t3 and makes a left turn onto the Central Street at time t4.

It is assumed that the user B moves toward the south along the Eastern Street at time points t1 and t2, makes a right turn onto the Central Street at time t3, and passes the Eastern Department Store at time t4.

2-2-1. Single-Point Display Mode

First, the single-point display mode is set so that the scale of a map to be displayed on the display screen is relatively large (the denominator of the scale is relatively small), the map showing a relatively small area is displayed on the display screen, and only the cursor indicating the user A is displayed on the display screen 1.

Specifically, for example, at time t1, the map 5a is displayed as part of the map 5 shown in FIG. 8 on the display screen 1 and the cursor 9a is displayed at the center of the display screen 1 (map 5a).

In the single-point display mode, as described above with reference to FIGS. 3 to 7, the display mode is switched between the map scroll mode and the map fixed mode in accordance with the moving speed Vt of the user A.

In the map fixed mode, the map showing area is changed as described above with reference to FIGS. 5A to 6 so that the cursor 9a does not disappear from the display screen 1.

2-2-2. Switching to Multi-Point Display Mode

In the multi-point display mode, the distance between the users A and B (the information processing apparatuses 10 and 20) is detected as an interobject distance every sampling time as a result of position measurement by the information processing apparatuses 10 and 20.

In the above-described case, at time t1, the users A and B are located at positions corresponding to points Pa1 and Pb1 on the map 5, respectively, as shown in FIG. 8. The interobject distance is the distance in a straight line (hereinafter, "straight-line distance") between the points Pa1 and Pb1. At time t2, the users A and B are located at positions corresponding to points Pa2 and Pb2 on the map 5, respectively. The interobject distance is the straight-line distance between the points Pa2 and Pb2.

As for the multi-point display mode, when the interobject distance is less than a threshold distance Dtl, the display mode is switched from the single-point display mode to the multi-point display mode. The threshold distance Dtl is set to an appropriate value in accordance with a map scale in the single-point display mode.

In the above-described case, although the interobject distance is equal to or less than the threshold distance Dtl up to time t1, the interobject distance is less than the threshold distance Dtl at time t2.

Accordingly, the display mode is switched from the single-point display mode to the multi-point display mode at time t2.

Figure 9A:
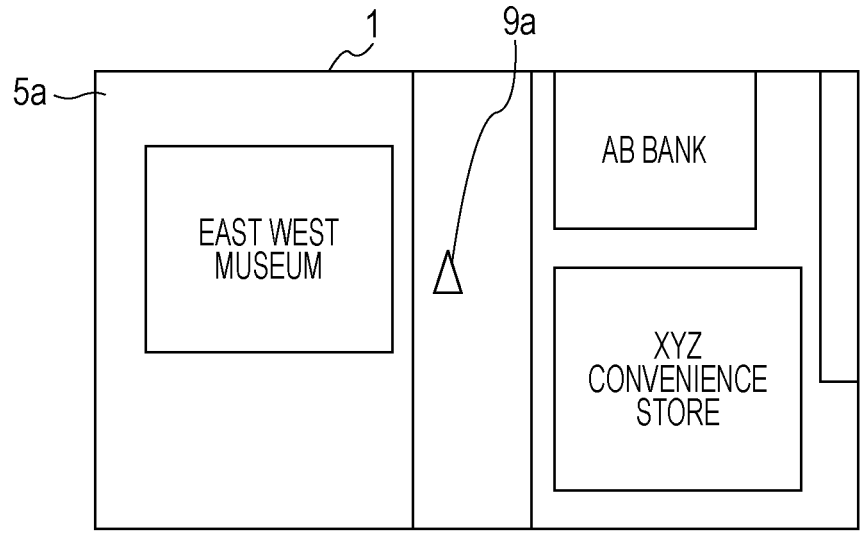
FIGS. 9A and 9B are diagrams illustrating a display state in the single-point display mode and that in a multi-point display mode.
Figure 9B:
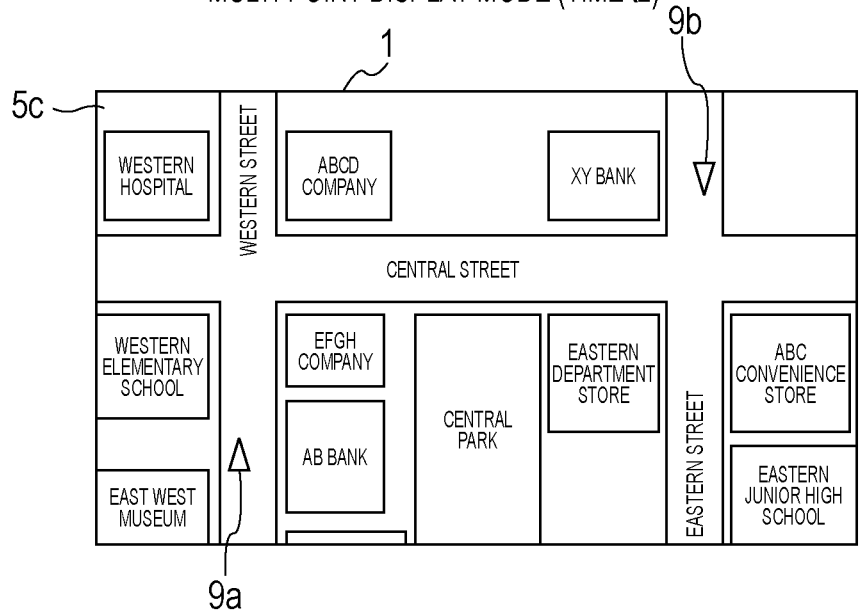

In the multi-point display mode, the scale of a map displayed on the display screen is smaller than that in the single-point display mode. As shown in FIG. 9B, a map 5c showing an area larger than that in the single-point display mode is displayed on the display screen 1.

The map 5c includes the respective current positions of the users A and B. On the display screen 1, the cursor 9a indicating the current position of the user A and a cursor 9b indicating the current position of the user B are simultaneously displayed.

Consequently, the user A finds that the users A and B are located within a predetermined range. In the information processing apparatus 20, since similar display processing is performed, the user B also finds that the users B and A are located in the predetermined range.

As distinct from the single-point display mode, the map scroll mode is not used in the multi-point display mode. The map fixed mode alone is used.

In the map fixed mode in the multi-point display mode, when the current position of either of the users A and b is located within the peripheral portion 1a of the display screen 1 shown in FIGS. 5A and 5B, the map showing area is changed as described above. At that time, the map showing area is changed so that the current positions of both the users A and B are located within the changed map showing area.

2-2-3. Switching from Multi-point Display Mode to Single-Point Display Mode

When the interobject distance (the straight-line distance between the users A and B) is greater than the predetermined value after switching from the single-point display mode to the multi-point display mode, the display mode is switched from the multi-point display mode to the single-point display mode.

Figure 10:
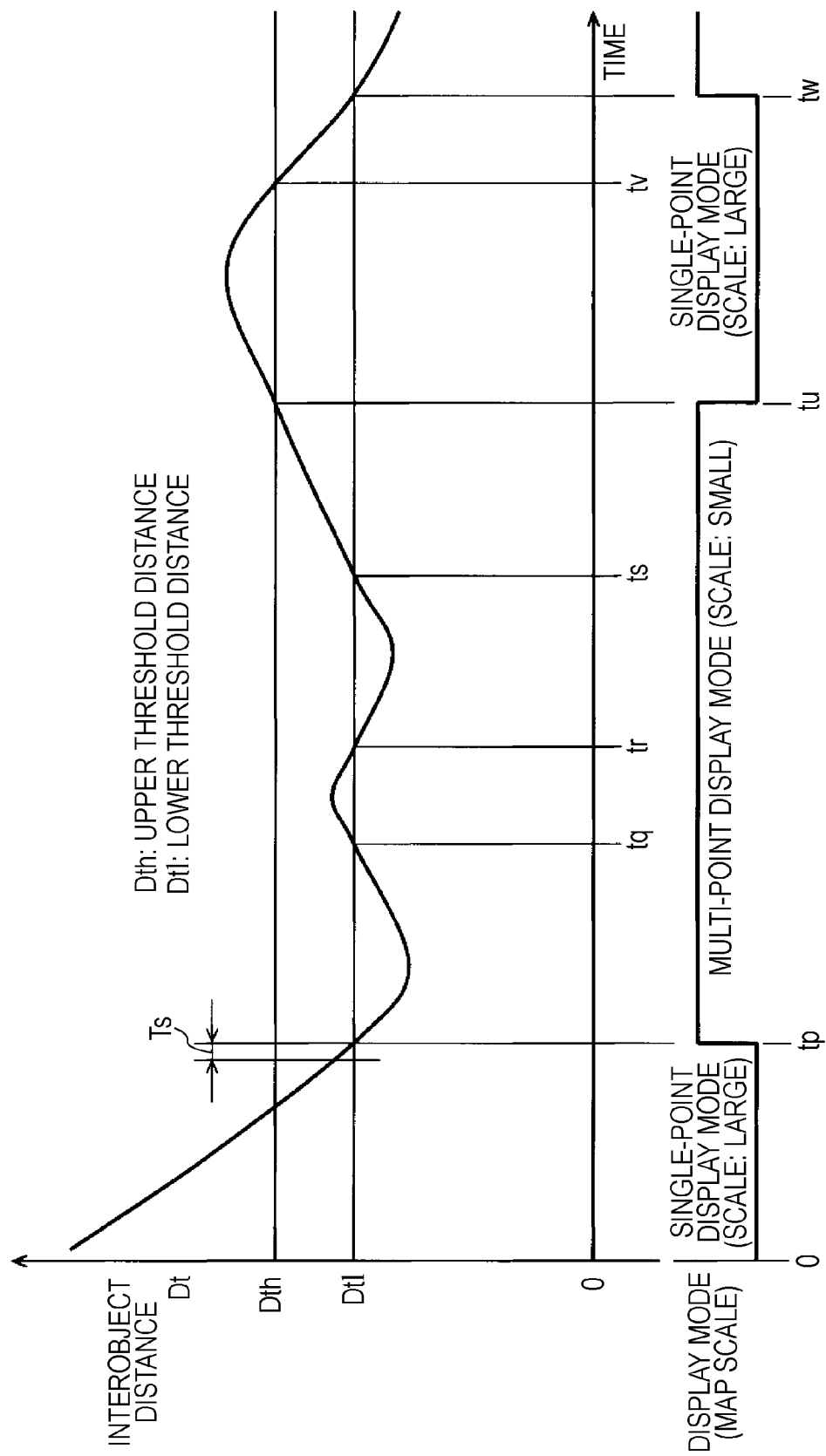
FIG. 10 is a diagram explaining mode switching between the single-point display mode and the multi-point display mode.

In some cases, for example, as shown by a curve in FIG. 10, the interobject distance, indicated at Dt, is less than the threshold distance Dtl at time tp and, after that, the interobject distance Dt varies around the threshold distance Dtl so as to be at the threshold distance Dtl at time points tq, tr, and ts.

It is not preferable that the display mode be changed at each of the time points tq, tr, and ts.

Accordingly, the threshold distance Dtl is set as a lower threshold distance and a threshold distance Dth greater than the threshold distance Dtl is set as an upper threshold distance so that hysteresis is provided for changing the display mode as follows.

As described above with reference to FIG. 7, the unit time Ts shown in FIG. 10 is the time interval between a certain sampling time and the next sampling time in a result of position measurement.

When the interobject distance Dt is decreasing, an interobject distance Dt(n) at time t(n) is less than an interobject distance Dt(n−1) at time t(n−1) earlier than time t(n) by the unit time Ts.

When the interobject distance Dt is increasing, the interobject distance Dt(n) at time t(n) is greater than the interobject distance Dt(n−1) at time t(n−1) earlier than time t(n) by the unit time Ts.

Accordingly, whether the interobject distance Dt is decreasing or increasing is determined by comparing the interobject distance Dt(n) at time t(n) with the interobject distance Dt(n−1) at time t(n−1) earlier than time t(n) by the unit time Ts.

When the interobject distance Dt is decreasing and is then less than the lower threshold distance Dtl, as shown at time tp in FIG. 10, the display mode is switched from the single-point display mode to the multi-point display mode as described above.

On the other hand, when the interobject distance Dt is increasing and is then greater than the threshold distance Dtl, as shown at time tq or ts, the display mode is not switched to the single-point display mode. When the interobject distance Dt is greater than the upper interobject distance Dth, as shown at time tu, the display mode is switched to the single-point display mode.

In FIG. 10, therefore, the display mode is switched from the single-point display mode to the multi-point display mode at time tp. The multi-point display mode is switched to the single-point display mode at time tu. The single-point display mode is switched to the multi-point display mode at time tw after time tv following time tu.

Accordingly, this prevents the problem that the display mode is often changed in a short time due to a variation in the interobject distance Dt within a small range in the short time.

2-3. Processing for Information Display 2-3-1. Display Mode Setting Process

Figure 11:
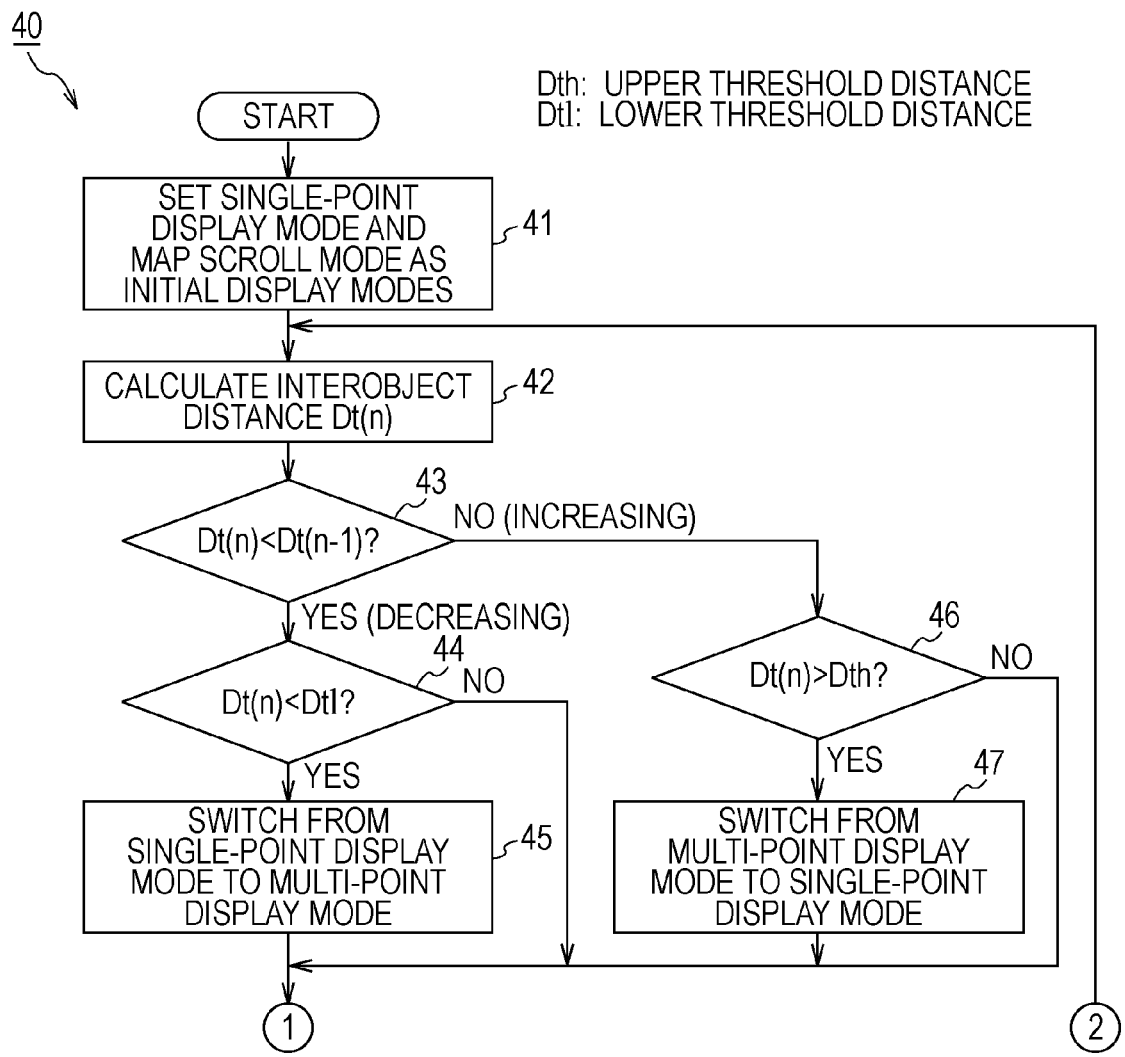
FIG. 11 illustrates a part of a flowchart of a display mode setting process.
Figure 12:
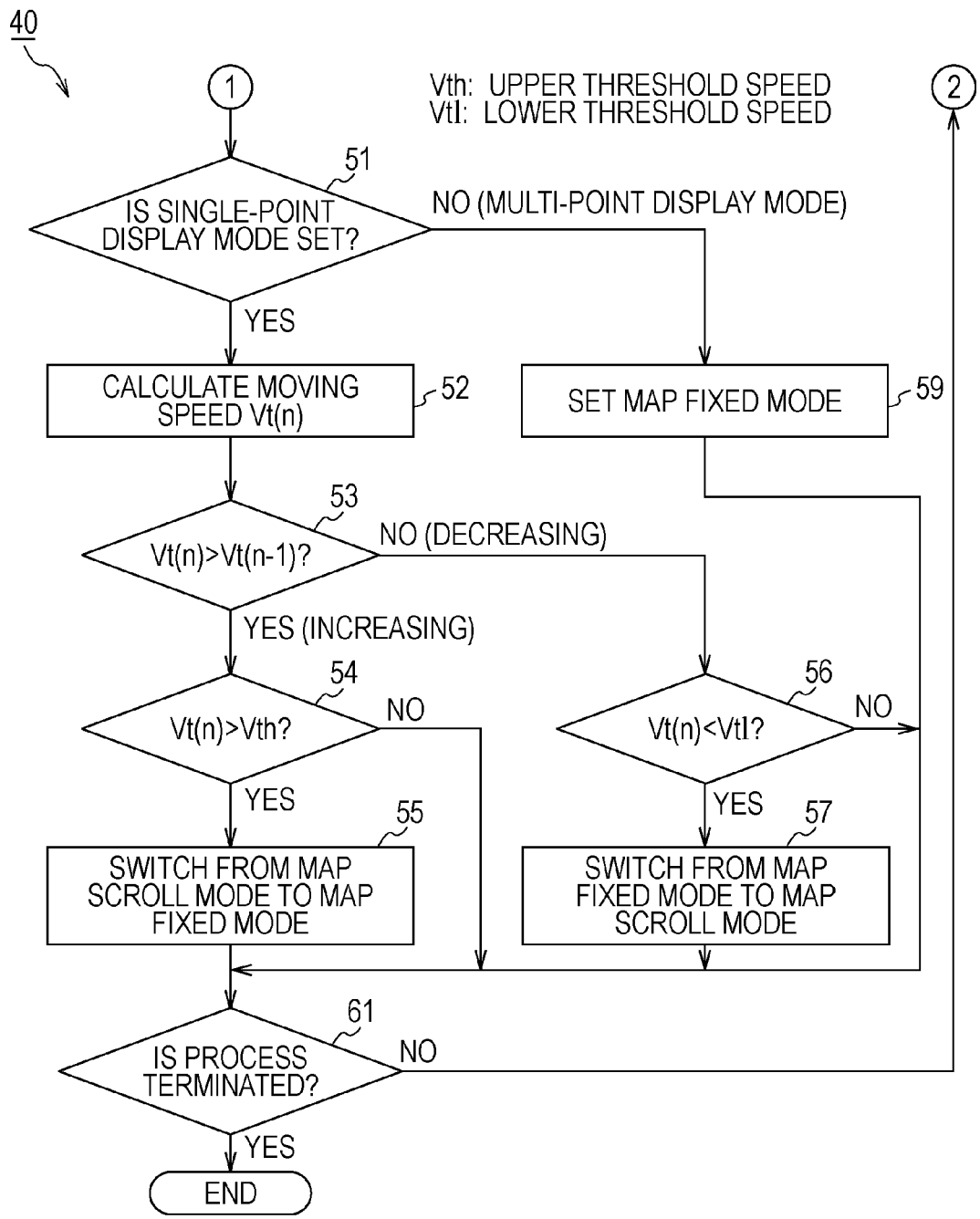
FIG. 12 illustrates the other part of the flowchart of the display mode setting process.

FIGS. 11 and 12 illustrate a series of processing steps related to the above-described display mode setting performed by the information processing apparatus 10.

The display mode setting process, indicated at 40, is started when the information processing apparatus 10 is turned on or the user A performs a starting operation. In step 41, the single-point display mode and the map scroll mode are set as initial display modes.

In step 42, the current interobject distance Dt(n) is calculated as described above with reference to FIG. 10.

In step 43, a determination is made as to whether the calculated current interobject distance Dt(n) is less than the preceding interobject distance Dt(n−1) obtained earlier by the unit time Ts.

When the current interobject distance Dt(n) is less than the preceding interobject distance Dt(n−1), it is determined that the interobject distance Dt is decreasing. The process proceeds from step 43 to step 44.

Whereas, when the current interobject distance Dt(n) is equal to greater than the preceding interobject distance Dt(n−1), it is determined that the interobject distance Dt is increasing. The process proceeds from step 43 to step 46.

In step 44, a determination is made as to whether the interobject distance Dt(n) is less than the lower threshold distance Dtl.

When the interobject distance Dt(n) is less than the lower threshold distance Dtl, the process proceeds from step 44 to step 45. In step 45, the display mode is switched from the single-point display mode to the multi-point display mode as shown at time tp or tw in FIG. 10. The process then proceeds to step 51.

When the interobject distance Dt(n) is equal to or greater than the lower threshold distance Dtl, the process proceeds from step 44 to step 51.

In step 46, a determination is made as to whether the interobject distance Dt(n) is greater than the upper threshold distance Dth.

When the interobject distance Dt(n) is greater than the upper threshold distance Dth, the process proceeds from step 46 to step 47. In step 47, the display mode is switched from the multi-point display mode to the single-point display mode as shown at time to in FIG. 10. The process proceeds to step 51.

When the interobject distance Dt(n) is equal to or less than the upper threshold distance Dth, the process proceeds from step 46 to step 51.

In step 51, a determination is made as to whether the display mode set at that time is the single-point display mode.

When the display mode set at that time is the single-point display mode, the process proceeds from step 51 to step 52. The current moving speed Vt(n) is calculated as described above with reference to FIG. 7.

In step 53, a determination is made as to whether the calculated current moving speed Vt(n) is greater than the preceding moving speed Vt(n−1) obtained earlier by the unit time Ts.

When the current moving speed Vt(n) is greater than the preceding moving speed Vt(n−1), it is determined that the moving speed Vt is increasing. The process proceeds from step 53 to step 54.

Whereas, when the current moving speed Vt(n) is equal to or less than the preceding moving speed Vt(n−1), it is determined that the moving speed Vt is decreasing. The process proceeds from step 53 to step 56.

In step 54, a determination is made as to whether the moving speed Vt(n) is greater than the upper threshold speed Vth.

When the moving speed Vt(n) is greater than the upper threshold speed Vth, the process proceeds from step 54 to step 55. In the single-point display mode, the display mode is switched from the map scroll mode to the map fixed mode as shown at time to or ti in FIG. 7. The process proceeds to step 61.

When the moving speed Vt(n) is equal to or less than the upper threshold speed Vth, the process proceeds from step 54 to step 61.

In step 56, a determination is made as to whether the moving speed Vt(n) is less than the lower threshold speed Vtl.

When the moving speed Vt(n) is less than the lower threshold speed Vtl, the process proceeds from step 56 to step 57. In the single-point display mode, the display mode is switched from the map fixed mode to the map scroll mode as shown at time tg in FIG. 7. The process proceeds to step 61.

When the moving speed Vt(n) is equal to or greater than the lower threshold speed Vtl, the process proceeds from step 56 to step 61.

When it is determined in step 51 that the display mode set at that time is not the single-point display mode but the multi-point display mode, the display mode is set not to the map scroll mode but to the map fixed mode in step 59. The process proceeds to step 61.

In step 61, a determination is made as to whether the process related to display mode setting is terminated. When the process is to be terminated in accordance with a terminating operation by the user A, the process is terminated. When the process is not to be terminated, the process is returned to step 42. Step 42 and the subsequent steps are repeated.

2-3-2. Drawing Routine

Figure 13:
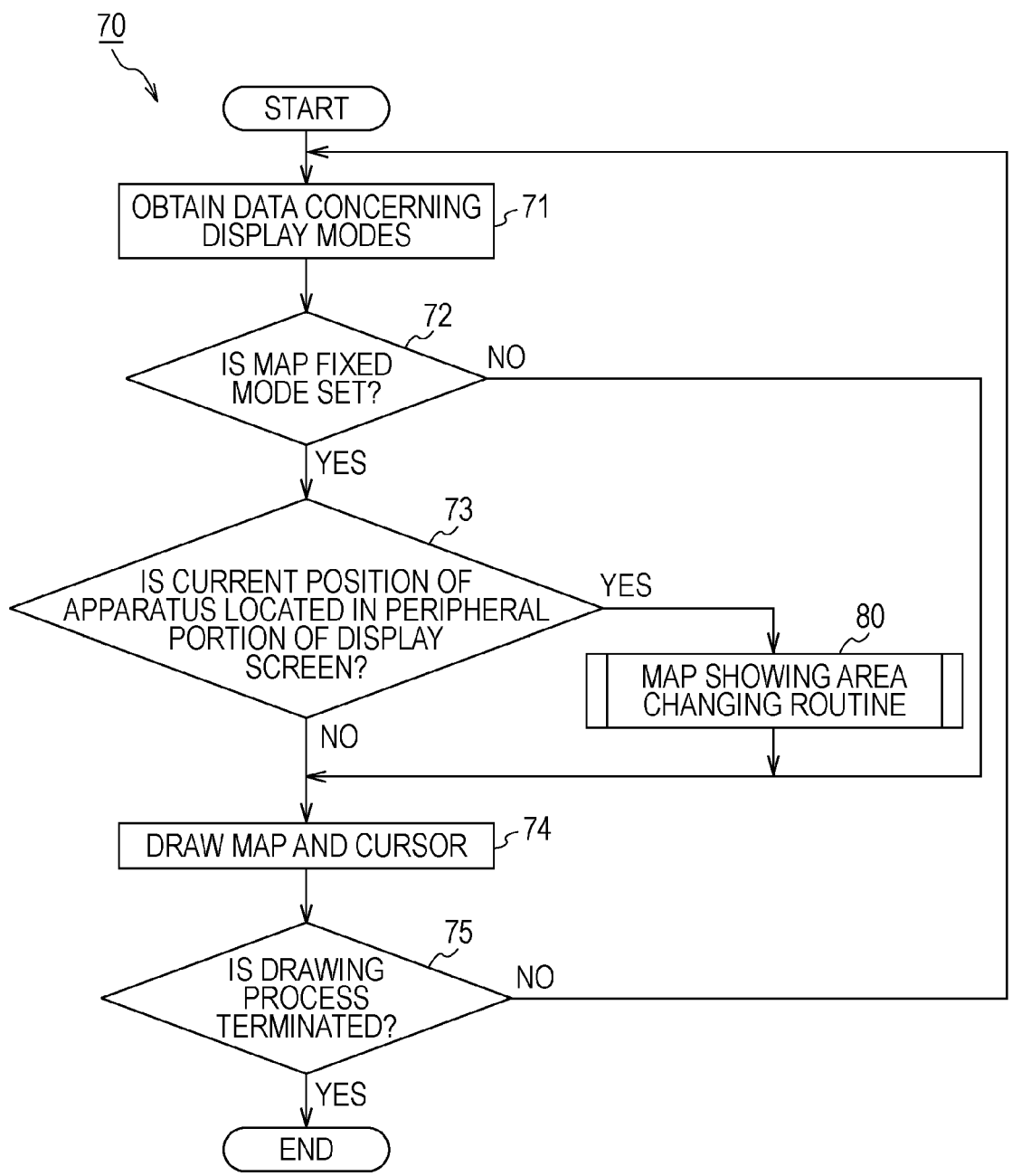
FIG. 13 is a flowchart of a drawing process.

FIG. 13 illustrates a drawing routine for information display, performed by the information processing apparatus 10, in the display modes set as described above.

This drawing routine, indicated at 70, is performed concurrently with the above-described display mode setting process 40 every sampling time as a result of position measurement.

According to the drawing routine or process 70, in step 71, data concerning the display modes set as described above is obtained. In step 72, a determination is made as to whether the map fixed mode is set.

As described above, either the map scroll mode or the map fixed mode is used in the single-point display mode. In the multi-point display mode, only the map fixed mode is used.

When the map fixed mode is set, the process proceeds from step 72 to step 73.

In step 73, a determination is made as to whether the current position of the apparatus (information processing apparatus 10) is located in the peripheral portion of the display screen as described above with reference to FIGS. 5A to 6.

When the current position of the apparatus is located in the peripheral portion of the display screen, the process proceeds from step 73 to a map showing area changing routine 80. In this routine, a map showing area changing process is executed as will be described later. After that, the process proceeds step 74.

When the current position of the apparatus is not located in the peripheral portion of the display screen, the process proceeds from step 73 to step 74.

When it is determined in step 72 that the set display mode is not the map fixed mode but the map scroll mode is set in the single-point display mode, the process proceeds from step 72 to step 74.

In step 74, a map and a cursor are drawn. The process then proceeds to step 75.

In step 75, a determination is made as to whether the drawing process is terminated. When the drawing process is not terminated but is continued, the process is returned to step 71. Step 71 and the subsequent steps are repeated.

Figure 14:
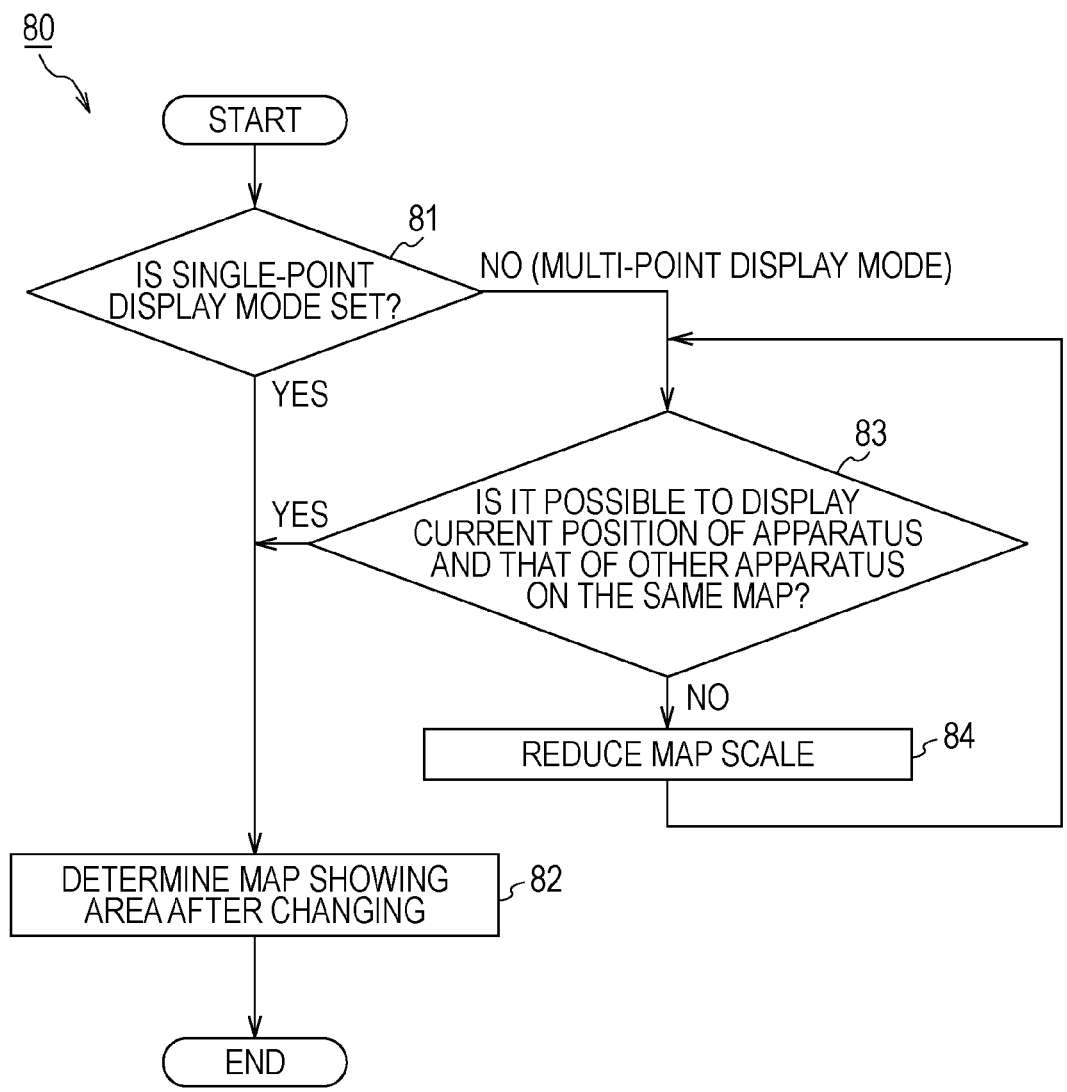
FIG. 14 is a flowchart of a map showing area changing process.

FIG. 14 illustrates the map showing area changing routine 80 shown in FIG. 13. According to the map showing area changing routine or process 80, in step 81, a determination is made as to whether the set display mode is the single-point display mode.

When the single-point display mode is set, the process proceeds from step 81 to step 82. In step 82, a map showing area after changing is determined as described above with reference to FIG. 6.

When the set display mode is the multi-point display mode, the process proceeds from step 81 to step 83. In step 83, a determination is made as to whether it is possible to display the current position of the apparatus and that of the other apparatus on the same map at the same scale as that in the single-point display mode.

When it is difficult to display the current position of the apparatus and that of the other apparatus on the same map at the same scale as that in the single-point display mode, the process proceeds from step 83 to step 84. In step 84, the map scale is reduced. After that, the process is returned to step 83.

When it is determined in step 83 that it is possible to display the current position of the apparatus and that of the other apparatus on the same map at the same scale as that in the single-point display mode or the map scale reduced in step 84, the process proceeds step 82. In step 82, a map showing area after changing is determined.

3. Other Embodiments

3-1. Map Display in Single-Point Display Mode

In the above-described case, when the moving speed Vt of a position indication object is greater than the upper threshold speed Vth in the single-point display mode, the map display mode is switched to the map fixed mode. While the map is not fixed on the display screen and the map scale is set smaller than that in the map scroll mode, the map scroll speed on the display screen may be reduced.

3-2. Position Indication Object in Multi-Point Display Mode

In the multi-point display mode, a first position indication object may be set to an information processing apparatus having a positioning function or a user and a second position indication object may be set to a fixed location or point such as a destination or an objective point.

In this case, for example, when the current position approaches a point at a predetermined distance from a destination, the display mode is switched from the single-point display mode to the multi-point display mode so that the current position and the destination are simultaneously displayed on the map.

In the multi-point display mode, the number of position indication objects is not limited to two. Three or more position indication objects may be used. For example, assuming that the number of position indication objects is three, when the distance between specific two objects, that between any two of the three objects, or that between each two of the three objects is less than the lower threshold distance, the two or three objects are simultaneously displayed on the map.

3-3. Non-Real Time Information Display

In the above-described case, the position of a position indication object is displayed in real time. The present invention is applicable to a case where the position of a position indication object is displayed in non-real time on the basis of recorded location log data.

Specifically, in the case of FIG. 2, the information processing apparatus 10 records location information, obtained as a result of position measurement by the GPS arithmetic unit 12, together with time information indicating the time of position measurement into the storage unit 14.

The information processing apparatus 20 also records location information, obtained as a result of position measurement by the GPS arithmetic unit 22, together with time information indicating the time of position measurement into the storage unit 24.

The location information is supplied from the storage unit 14 or 24 to an information processing apparatus, such as a personal computer (PC). The information processing apparatus (PC) displays a position measured as the current position of the information processing apparatus 10 or 20 in non-real time.

Accordingly, the present invention is effectively useful for life-log applications.

The present application contains subject matter related to that disclosed in Japanese Priority Patent Application JP 2008-173200 filed in the Japan Patent Office on Jul. 2, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information display method whereby an information processing apparatus displays a map on a display screen such that a cursor is displayed at a position measured as a current position of a position indication object on the map, the method comprising the steps of:

controlling a scale of the map, wherein controlling the scale of the map comprises:
receiving a first position of a first position indication object;
calculating an interobject distance that is a distance between the first position of the first position indication object and a second position of a second position indication object;
comparing the interobject distance to a threshold distance;
in response to determining that the interobject distance is equal to or greater than the threshold distance, configuring the map for display on the display screen at a first scale such that the cursor indicating the first position of the first position indication object is displayed on the map and the second position of the second position indication object is not indicated in the map; and
in response to determining that the interobject distance is less than the threshold distance, configuring the map for display on the display screen at a second scale smaller than the first scale such that both the cursor indicating the first position of the first position indication object and another cursor indicating the second position of the second position indication object are displayed on the map.

2. The method according to claim 1, wherein
the first position indication object is the information processing apparatus,
receiving the first position of the first position indication object comprises determining, with the information processing apparatus, a position of the information processing apparatus,
the second position indication object is a second apparatus different from the information processing apparatus, and
controlling the scale of the map further comprises receiving, at the information processing apparatus from the second apparatus, location information identifying a second position of the second apparatus.

3. The method according to claim 1, wherein
the first position indication object is a first apparatus which differs from the information processing apparatus,
the second position indication object is a second apparatus which differs from the information processing apparatus,
receiving the first position of the first position indication object comprises receiving, at the information processing apparatus from the first apparatus, location information identifying the first position of the first apparatus, and controlling the scale of the map further comprises receiving, at the information processing apparatus from the second apparatus, location information identifying a second position of the second apparatus.

4. The method according to claim 1, wherein configuring the map for display at the second scale comprises configuring the map to be displayed fixed on the display screen.

5. The method according to claim 1, wherein controlling the scale of the map further comprises:
when the map is configured for display at the second scale such that both the cursor indicating the first position of the first position indication object and another cursor indicating the second position of the second position indication object are displayed on the map,
comparing the interobject distance to a second threshold distance larger than the threshold distance,
in response to determining that the interobject distance is greater than the second threshold distance configuring the map for display on the display screen at the first scale such that the cursor indicating the first position indication object is displayed on the map and the second position of the second position indication object is not indicated in the map, and
in response to determining that the interobject distance is less than or equal to the second threshold distance, maintaining configuration of the map for display on the display screen at the second scale.

6. The information display method of claim 1, wherein receiving the first position of the first position indication object comprises monitoring position of the first position indication object over time.

7. The information display method of claim 6, wherein controlling the scale of the map comprises monitoring position of the second position indication object over time.

8. The information display method of claim 6, wherein controlling the scale of the map comprises controlling the scale over time in response to changes in the first position of the first position indication object over time.

9. The information display method of claim 1, further comprising:
displaying the map on the display screen,
wherein controlling the scale of the map comprises controlling the scale during the displaying of the map.

10. The information display method of claim 1, further comprising:
outputting the map for display on the display screen.

11. The information display method of claim 10, wherein outputting the map for display comprises communicating the map to the information processing apparatus for display.

12. The information display method of claim 11, wherein:
receiving the first position of the first position indication object comprises monitoring position of the first position indication object over time;
controlling the scale of the map comprises controlling the scale over time in response to changes in the first position of the first position indication object over time; and
communicating the map to the information processing apparatus for display comprises communicating the map to the information processing apparatus in response to a change in the scale of the map during the controlling.

13. An information processing apparatus comprising:
at least one processor; and
at least one storage medium having encoded thereon executable instructions that, when executed by the at least one processor, cause the at least one processor to carry out a method comprising outputting a map for on a display screen over time such that a first cursor is displayed at a position determined to be a first current position of a first position indication object at a time; and
control means for controlling a scale of the map during the outputting over time, wherein controlling the scale of the map comprises, in response to determining that an interobject distance, which is a distance between a first position indication object and a second position indication object, is equal to or greater than a threshold distance, outputting the map for display on the display screen at a first scale such that the first cursor indicating the first current position of the first position indication object is displayed on the map and a second position of the second position indication object is not indicated in the map, and, in response to determining that the interobject distance is less than the threshold distance, outputting the map for display on the display screen at a second scale smaller than the first scale such that both the first cursor indicating the first current position of the first position indication object and another cursor indicating the second position of the second position indication object are displayed on the map.

14. At least one non-transitory computer-readable storage medium having encoded thereon executable instructions that, when executed by a computer provided for an information processing apparatus, which displays a map on a display screen such that a cursor is displayed at a position measured as a current position of a position indication object on the map, to cause the computer to carry out a method comprising:
controlling a scale of the map, wherein controlling the scale of the map comprises:
in response to determining that an interobject distance, which is a distance between a first position indication object and a second position indication object, is equal to or greater than a threshold distance, outputting the map at a first scale in a first display mode such that the cursor indicating the first position indication object is displayed on the map and a second position of the second position indication object is not indicated in the map; and
in response to determining that the interobject distance is less than the threshold distance, outputting the map at a second scale smaller than the first scale such that both the cursor indicating the first position indication object and another cursor indicating the second position of the second position indication object are displayed on the map.

15. An information processing apparatus comprising:
at least one processor; and
at least one storage medium having encoded thereon executable instructions that, when executed by the at least one processor, cause the at least one processor to carry out a method comprising:
outputting a map for display on a display screen over time such that at least a first cursor is displayed at a first position determined to be a first current position of a first position indication object at a time; and
during the outputting of the map over time, controlling a scale of the map, wherein controlling the scale of the map comprises in response to determining that an interobject distance, which is a distance between a first position indication object and a second position indication object, is equal to or greater than a threshold distance, configuring the map for display on the display screen at a first scale such that the first cursor indicating the first current position of the first position indication object is displayed on the map and a second position of the second position indication object is not indicated in the map, and, in response to determining that the interobject distance is less than the threshold distance, configuring the map for display on the display screen at a second scale smaller than the first scale such that both the first cursor indicating the first current position of the first position indication object and another cursor indicating the second position of the second position indication object are displayed on the map.

* * * * *